US009779292B2

United States Patent
Ng

(10) Patent No.: US 9,779,292 B2
(45) Date of Patent: Oct. 3, 2017

(54) SYSTEM AND METHOD FOR INTERACTIVE SKETCH RECOGNITION BASED ON GEOMETRIC CONTRAINTS

(71) Applicant: William Ng, Chicago, IL (US)

(72) Inventor: William Ng, Chicago, IL (US)

( * ) Notice: Subject to any disclaimer, the term of this patent is extended or adjusted under 35 U.S.C. 154(b) by 0 days.

(21) Appl. No.: 14/884,014

(22) Filed: Oct. 15, 2015

(65) Prior Publication Data

US 2016/0155248 A1 Jun. 2, 2016

Related U.S. Application Data

(60) Provisional application No. 62/064,255, filed on Oct. 15, 2014.

(51) Int. Cl.
*G06T 11/20* (2006.01)
*G06K 9/00* (2006.01)

(52) U.S. Cl.
CPC .......... *G06K 9/00416* (2013.01); *G06T 11/20* (2013.01); *G06T 11/203* (2013.01)

(58) Field of Classification Search
CPC ....................................................... G06F 3/041
See application file for complete search history.

(56) References Cited

U.S. PATENT DOCUMENTS

| | | | | |
|---|---|---|---|---|
| 6,792,398 B1 * | 9/2004 | Handley | ................. | G06F 3/016 345/419 |
| 2002/0146175 A1 * | 10/2002 | Goldfoot | ............... | G06K 9/222 382/203 |
| 2007/0171194 A1 * | 7/2007 | Conti | ...................... | G06F 3/016 345/156 |
| 2010/0149109 A1 * | 6/2010 | Elias | ................... | G06F 3/04845 345/173 |
| 2011/0279455 A1 * | 11/2011 | McDaniel | ............... | G06T 19/20 345/427 |
| 2012/0141032 A1 * | 6/2012 | Ouyang | ............. | G06K 9/00422 382/187 |
| 2012/0176416 A1 * | 7/2012 | Dondurur | ........... | G06F 3/04845 345/666 |
| 2013/0188877 A1 * | 7/2013 | Gulwani | ............. | G06F 3/04883 382/203 |
| 2014/0108976 A1 * | 4/2014 | Steiner | ............... | G06K 9/00436 715/765 |
| 2015/0205398 A1 * | 7/2015 | Le | ........................... | G06T 11/00 345/173 |

* cited by examiner

*Primary Examiner* — Phi Hoang
(74) *Attorney, Agent, or Firm* — Ziliak Law LLC; Adam E. Urbanczyk

(57) ABSTRACT

The present invention discloses a system and method to recognize the geometric primitives and estimate the intended geometric relationship between the primitives. The system also provides its user an interactive feedback mechanism to better provide the graphic results intended by the user. The areas enclosed by the lines drew by the user is also considered by the system in the graphic result calculation process to improve the graphic results. One main feature of the present system is to provide geometric constraints estimations based on calculation of the constraints' effect on all related primitives and previously existing geometric constraints.

22 Claims, 9 Drawing Sheets

Graphics from just the position data of the free-sketch

Graphics closer to what user intended

Graphics from just the position data of the free-sketch

Graphics closer to what user intended

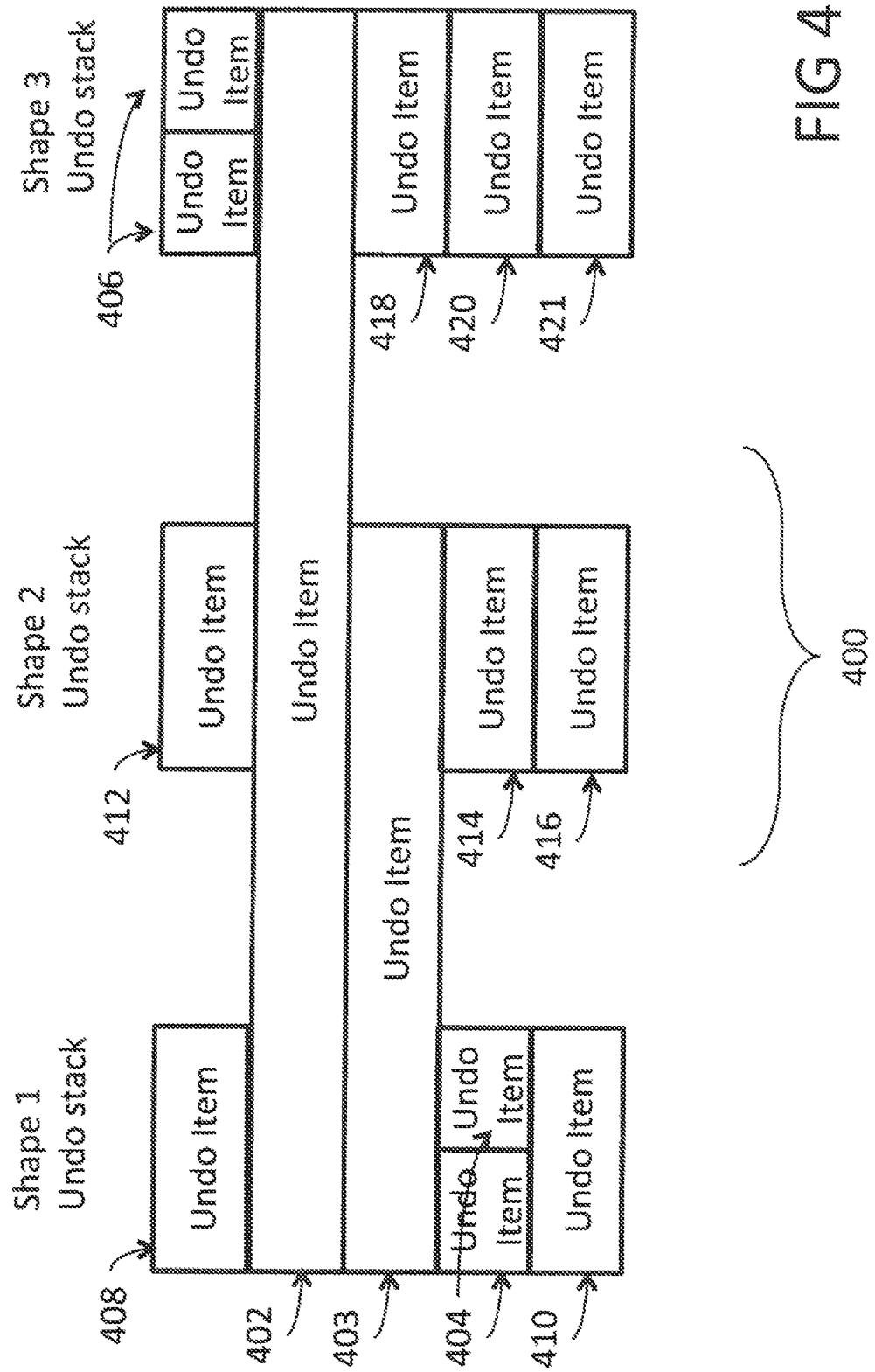

Drawing with 5 straight lines

The representing graphs

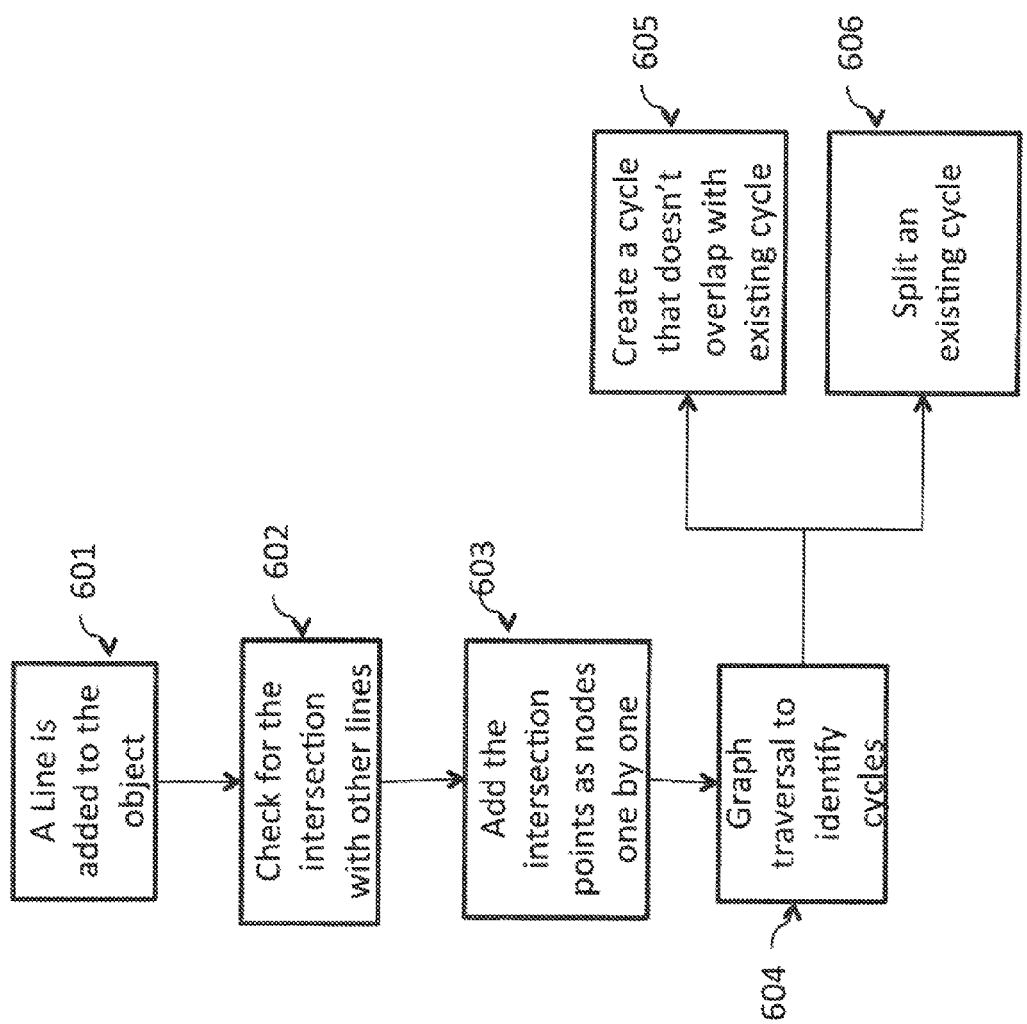

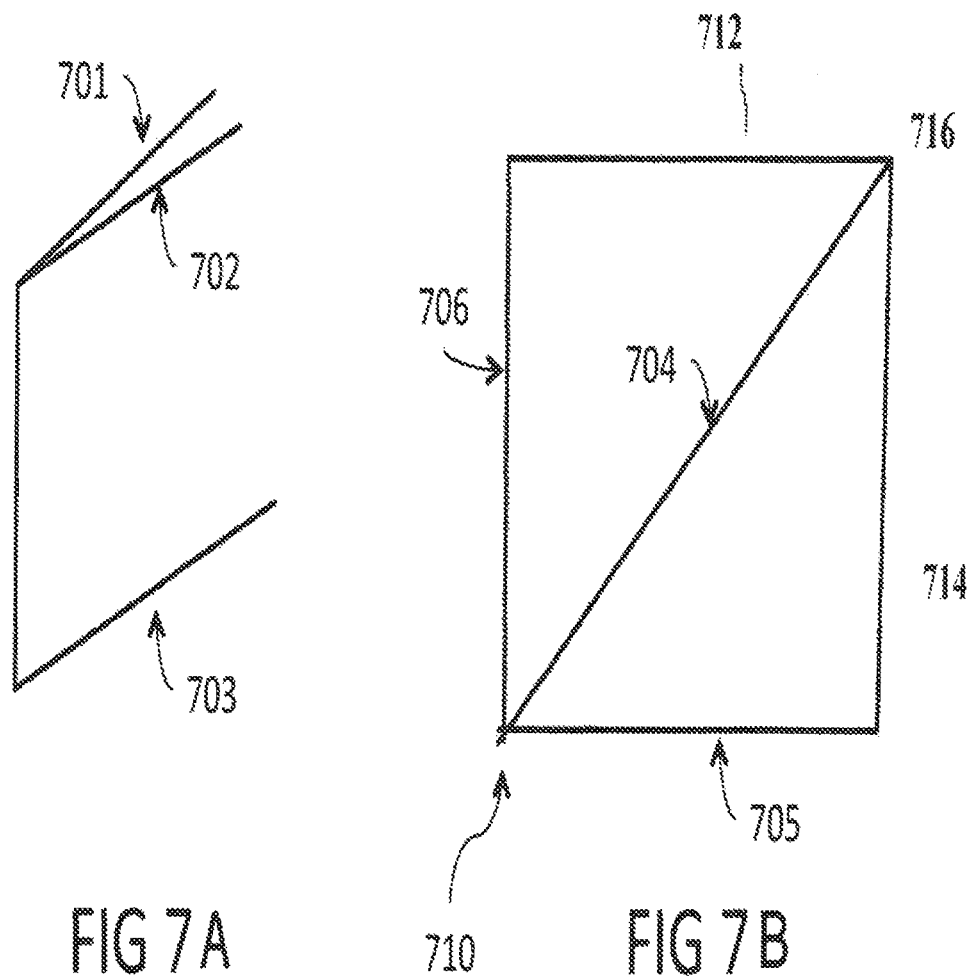

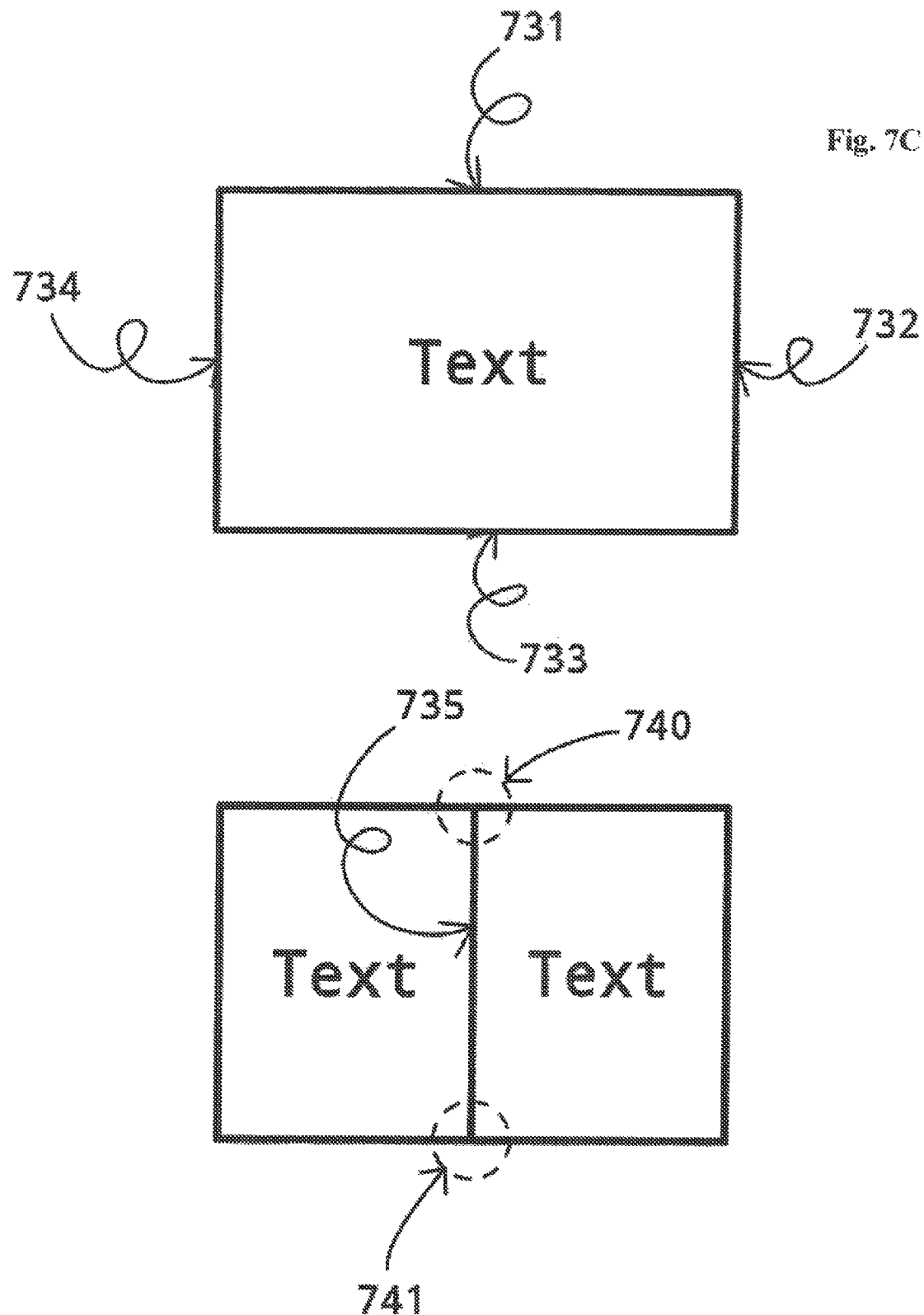

SYSTEM AND METHOD FOR INTERACTIVE SKETCH RECOGNITION BASED ON GEOMETRIC CONTRAINTS

CROSS REFERENCE TO RELATED APPLICATIONS

This application claims priority from U.S. Provisional Appl. No. 62/064,255, filed Oct. 15, 2014, entitled "INTERACTIVE SKETCH RECOGNITION TOOL BASED ON GEOMETRIC CONSTRAINTS," all of which is incorporated herein by reference in its entirety for all purposes.

TECHNICAL FIELD

This application relates to an interactive system that processes user's hand-sketched drawings data and converts it into the user's intended graphics.

BACKGROUND OF THE INVENTION

With the proliferation of capacitive touch screen devices, or motion tracking devices using infrared (IR) or devices based on image processing and camera, there is an opportunity for a graphics tool to create graphics intuitively based on free-sketch hand motions, just like it would be using pen and paper.

Free-hand drawing programs process sketch input received, whether through the user's input on a touch screen device, or through a motion-tracking device, and interpret the input as graphics. When the computer processes the free-hand sketch graphics, it can be processed as raster graphics like that of a physical ink and paper, i.e. color information is stored per location. But the sketch graphics information is hard to modify and not precise. In contrast, vector graphics organize it using logical concept, such as line and area and position. It allows users to easily modifiable and it is precise in representing the geometric primitives. It can also be extended for higher logical concept, such as the meaning of a diagram.

One of the most common and traditional approaches for handwriting recognition for converting free hand sketch to computer graphics is to matching the sketch with a list of predefined shapes. It can employ a wide variety of parameters for matching or different algorithm to find the best match. However, this approach is very inflexible, such that the result graphics is limited to the set of predefined shapes and it may not contain the variation and features desired by the user.

Another shortcoming of most tools is the process of conversion is very opaque to the user. A traditional free-hand drawing application attempts to "beautify" the sketch input by matching rough sketches to predefined geometric shapes, then replace the rough sketches with the matched predefined geometric shapes. Since it is hard to achieve 100% confidence to convert the free-hand sketching to the desired graphics by the user, it is important to have a good feedback system for a user to correct the conversion. And the feedback system has to be easy and intuitive, so that it wouldn't be more complicated than creating the graphics in traditional way.

The presented invention is an interactive system that converts users' hand-sketched drawing into the graphics that is intended by users. There are a few factors that caused the hand-sketched drawing to be different from the intended graphics. A good example would be that most people cannot draw a perfect circle on a piece of paper with a pen without the help of other tools. In the case of sketching on a touch screen with finger, there is noise and ambiguity in the system detecting the position of the finger, and the finger might block the user from seeing the position of the pointer.

United States Patent Publication 2006/0227140 Ramani et al., teaches a method for beautifying a drawn sketch (FIG. 2; Abstract); wherein there are implicit and explicit constraints (FIG. 1; [0108] and [0110]); changing lines to be either parallel or perpendicular based upon implicit constraints and satisfies the explicit constraints provided by user. See [0110]. Ramani discloses that an algorithm can be used to detect the implicit constraints and beautify the sketches ([0078]), wherein determining if the lines should be transformed to be parallel is based on the angle difference between the two lines ([0088]). Thus, Ramani teaches identifying a transformation between each pair of objects in the drawing to produce transformation information (determining the information of how the lines should be transformed (such as making the lines parallel) ([0088]).

However, Ramini does not disclose the process to prioritize a group of potential geometric constraints that can be prioritized based on their properties and be applied to the determined geometric primitives to produce a result with the highest priority that satisfies all the pre-existing geometric primitives and within the limit determined by the possible positional error.

In FIGS. 1A and 1B, it shows an example of the difference between the intended graphics and just the raw input of the user's hand. The present invention is designed to overcome the noise, ambiguity and other factor mentioned above through the use of geometric constraint solver, and the user's feedback to correct the result. It is based on the notion that most graphics can be composed of geometric primitives, e.g. lines, straight lines, curve line, circular arc, and geometric constraints, such as, parallelism and tangency. FIG. 2 shows a drawing with some of the geometric primitives and constraints pointed out-a straight horizontal line 20, a half dome circle arc 22, at least one connection between the circle arc 22 and the horizontal straight line 20, and five straight lines 26 emitting perpendicularly 24 from the circle arc 22.

By recognizing the right geometric primitives and right geometric constraint, it can recreate what the user intended, even given a very noisy input. And the present invention achieves this goal in a two pronged strategy—applying a reasonable set of geometric constraint with a novel use of geometric constraint solver, and providing an intuitive user feedback mechanism to correct any part of the result.

SUMMARY OF THE INVENTION

An interactive sketch recognition system is described herein for creating a drawing intended by a user. The user sketches the drawing on a device that collects both the position and time data of the user's hand movement. In one implementation, the present inventive system recognizes the basic graphics elements and estimates their graphical relationships from the position and time data. The position data describes the raw outline of the user's free-sketch hand motions. There are several different ways to execute this step, documented in various literatures (e.g. 2008 Paulson, B. and Hammond, T.—PaleoSketch). It normally involved segmenting the sketch into different segments. And then at each segment, the sketch data is matched to different primitives by different measures of similarity. The graphic relationships are represented as geometric constrains. By solving the geometrics constrains problems, the system interprets and construes the graphics intended by the user.

The system, in one embodiment, uses the position and temporal data from the input as the boundary of the geometric constraint solution, so that the result would always be close to what the user draws.

In another embodiment of the present invention, the geometric constrains are applied to the geometric primitive one at a time in succession. Applied geometric constraints are stored with the primitives. When applying a geometric constraint, the system would find a solution that satisfies both the previously applied geometric constraint and the currently newly input geometric constraint with the least change to the graphics elements. The change to the graphics elements is compared to the boundary that is defined by the physical user's hand position and the possible error tolerance based on various factors, including the temporal data.

In one embodiment of the present invention, graphical relations of the higher confidence or higher importance are applied first as geometric constraint.

In one embodiment of the present invention, the graphics elements and the graphical relations are detected and processed at each stroke from user drawing inputs. The result graphics are generated and shown to user immediately, so the user can modify the elements and correct any parameters immediately before the next stroke or later. The graphical relationships and calculation of the next stroke will be based on the corrected elements, if the user so chose to correct the outcome from the system.

In one embodiment of the present invention, a user may correct any system recognition results via the undo paradigm. The system is expected to produce the desired result in most cases, and the users are left with a small number of highly contextual-dependent choices. Users wouldn't have to consider or look through a large menu of choices, which is time-consuming and be in the way of the creation process. These undo items are stored according its dependency on the shapes, so that it is possible to be executed not strictly limited to chronological order. The items might not be displayed according to the actual chronological order happened in the system, or there can be more than one choice for undo.

In one embodiment of the present invention, the graphics are presented to the user in an intuitive logical representation where the graphics are composed of lines but those lines can be parts of different kind of logical objects. Areas are defined by the surrounding lines within an object. It is in contrast with prior art vector graphics system where there are different logical entity for path, straight line, polyline and rectangle. It will be described in more details in the later section of how the system translates between the logical representations.

BRIEF DESCRIPTION OF THE DRAWINGS

The features of the present invention which are believed to be novel are set forth with particularity in the appended claims. The invention may best be understood from the following detailed description of currently illustrated embodiments thereof taken in conjunction with the accompanying drawings wherein like numerals refer to like parts, and in which

FIG. 4 shows an embodiment of the data structure of the undo stack in the present system.

FIG. 6 shows an implementation of the cycle identification module.

FIG. 7A shows an illustration of a proposed result being rejected because of illogical outcome.

FIG. 7B shows an illustration of a prediction of combining three closely located points, and a large enclosed area divided by a line.

FIG. 7C shows an illustration of the function results performed by the cycle identification module.

DETAILED DESCRIPTION

As a preliminary matter, this disclosure is provided to introduce a selection of concepts in a simplified form that are further described hereinafter. The illustrated figures describe concepts in the context of one or more structural components, variously referred to as functionality, modules, features, elements, etc. The various components shown in the figures can be implemented in any manner by any physical and tangible mechanism, for instances, by software, hardware (e.g. chip-implemented logic functionality), firmware, etc., and/or any combination thereof. Concepts are also described in flowchart form. Certain operations are described as constituting distinct blocks performed in a certain order. Such implementations are illustrative and non-limiting. Certain blocks described herein can be grouped together and performed in a single operation. It should also be recognized that certain blocks can be broken apart into plural component blocks, and certain blocks can be performed in an order that differs from that which it illustrated in the figures of this disclosure. The flowcharts contain blocks that can be implemented in any manner by any physical and tangible mechanisms, including but not limited to software, hardware (e.g. chip-implemented logic functionality), firmware, etc., and/or any combination thereof.

The present invention is not limited to use's sketching with a hand on a touch-screen device. It can also be implemented by using a pen or stylus to input the movements, or through a camera system that tracks the movement of the user on a surface or in a space. The present invention is applicable but not limited to any system where the user control the trajectory of an object and the system may record the position, temporal or other kind of data and attempt to create graphics or logical entity or any kind of result that is desired by the user. The invention could be a sub-system in a greater algorithm. The invention is not limited to any kind of computing environment or device.

Figure 1A:
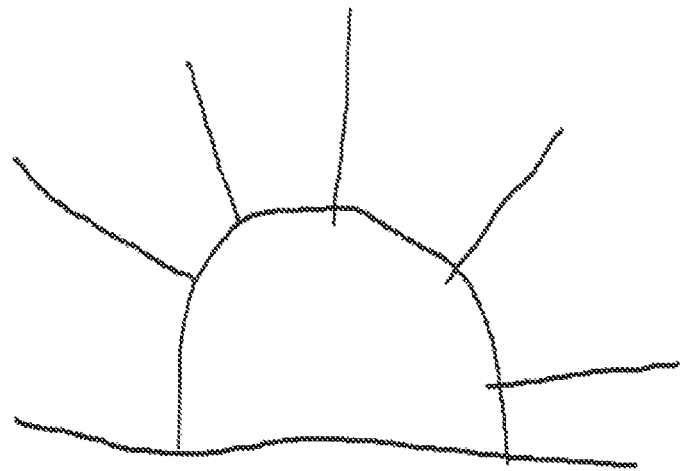
FIG. 1A shows an illustrative example of the raw position of the user's free-sketch input.
Figure 1B:
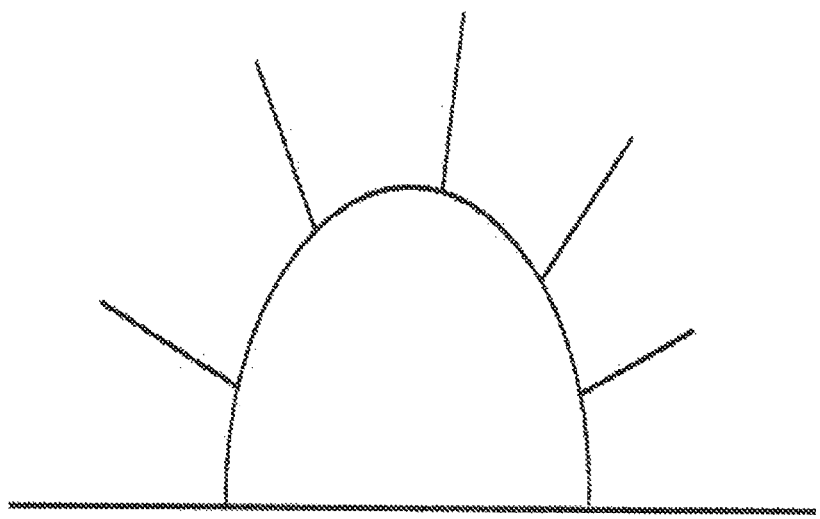
FIG. 1B shows an illustrative example of the graphic intended by the user that inputs FIG. 1A.

FIG. 1A shows a graphic from just the raw position of the user's free-sketch input. FIG. 1B shows the graphic intended by the user that inputs FIG. 1A.

Figure 2:
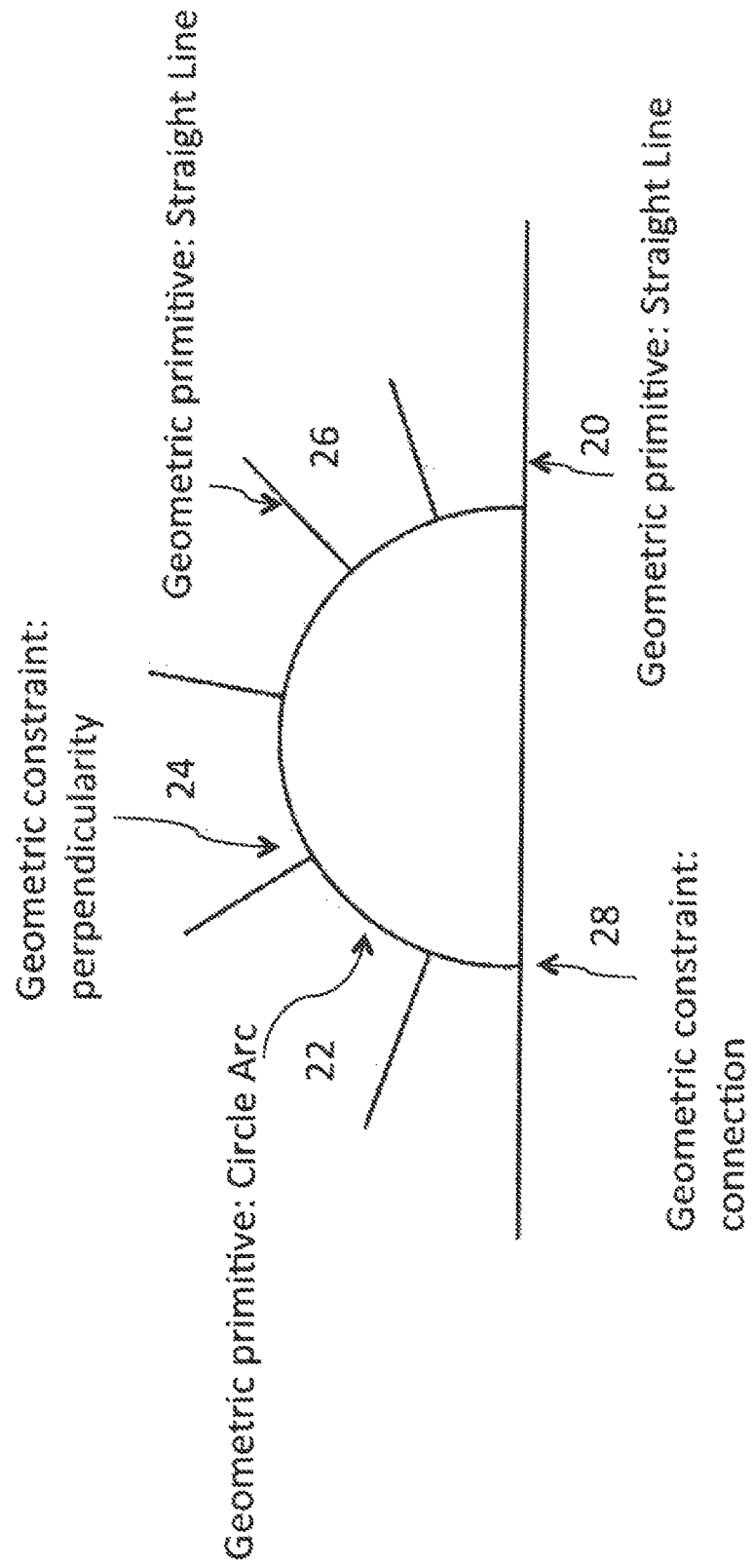
FIG. 2 shows a drawing with at least one of the geometric primitives and constraints pointed out.

FIG. 2 shows a drawing with some of the geometric primitives and constraints pointed out-a straight horizontal line 20, a half dome circle arc 22, at least one connection between the circle arc 22 and the horizontal straight line 20, and five straight lines 26 emitting perpendicularly 24 from the circle arc 22.

Figure 3:
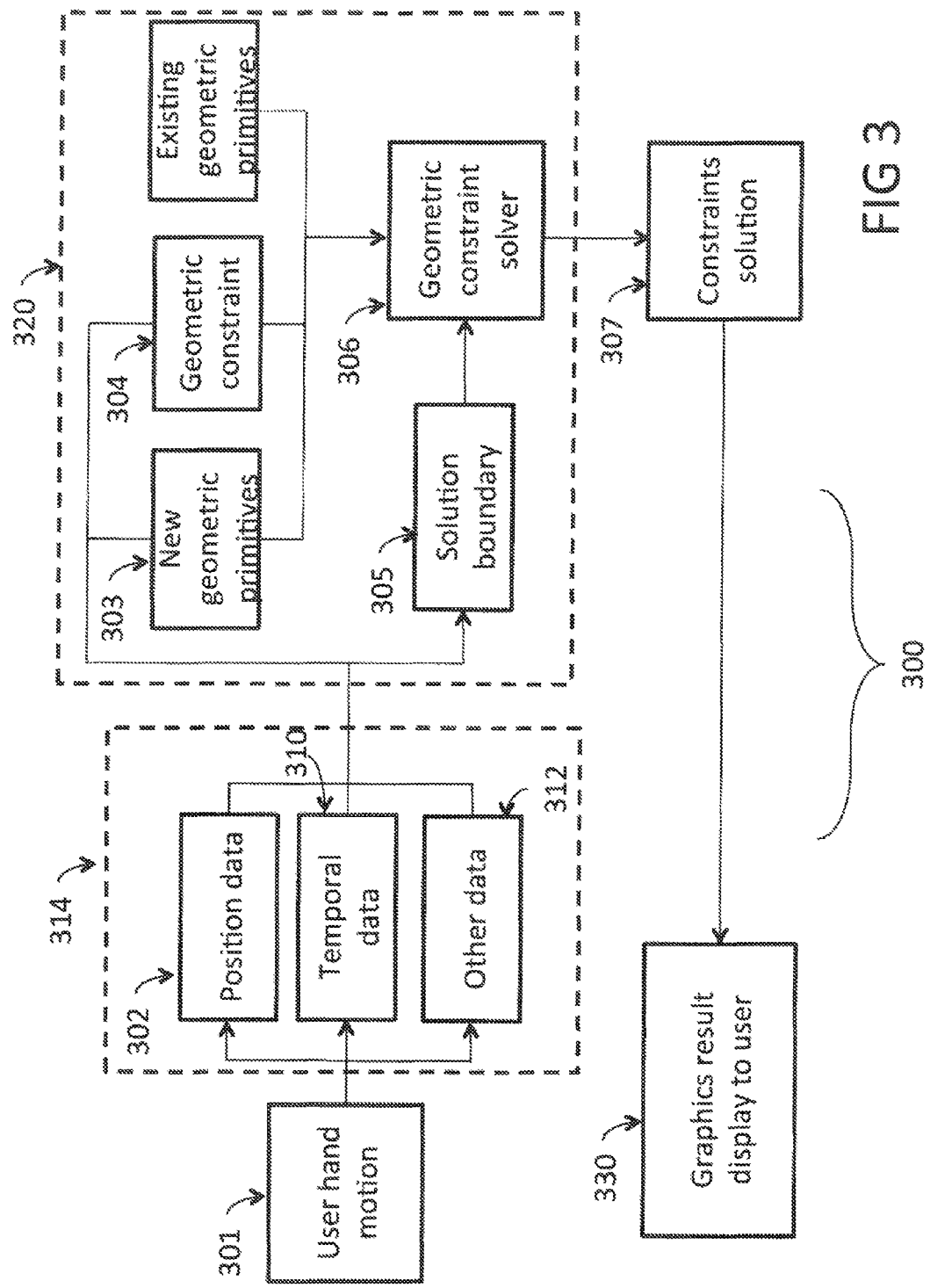
FIG. 3 shows an illustrative environment in which an interactive sketch recognition system processes the user's free-sketch hand input to geometric solver and then to graphics result.

FIG. 3 an interactive sketch recognition system processes the user's free-sketch hand input to geometric solver and then to graphics result. The system 300 is designed to be able to correspond to any context in which a user wishes to produce a drawing having precise geometric shapes and precise spatial relationships among the geometrical shapes. The system can be implemented in any kind of engineering, scientific, academic, business-related or other environment or context. The various different functions performed in the component in the system 300 will be illustrated herein.

When a user sketches a drawing, the position data 302 and temporal data 310 of the user's hand motion 301 is taken as inputs through an input module 314. The input can be taken by at least one sketch input device. In one embodiment, the sketch input device can include any mechanism having a touch-sensitive surface on which the user may draw, or any system that tracks the movement of the user on a surface or in a space. In some cases, the touch-sensitive surface of the sketch input device may be integrated with a display screen of an output device. The display screen of the output device produces a visible rendering of the user's sketch as the user draws the sketch on the sketch input devices, and allows the user to provide feed back to correct or modify the graphics results produced by the interactive sketch recognition system 300. The display screen of the output device can be a separate device from the touch-sensitive surface of the sketch input device. The input module 314 takes sketch input through other viable means including but not limited to using a pressure sensitive stylus or infra-red camera. Thus the input module may capture other data 312, such as pressure or pen orientation, depending on the platform.

After data received at input module 314, the system 300 proceeds to process the original data using a recognition module 320. The recognition module 320 produces geometric primitives 303 intended by the user using data received from the input module 314. For example, the geometric primitives correspond to straight lines 20 and 26, and circle arc 22 in FIG. 2. The data collected by the input module 314 describes the raw outline of the user's free-sketch hand motions. There are several different ways to execute this step 303, documented in various literatures (e.g. 2008 Paulson, B. and Hammond, T.—PaleoSketch). Step 303 normally involved segmenting the sketch into different segments. And then at each segment, the sketch data is matched to different primitives by different measures of similarity. However, in other cases, the recognition module 320 can recognize and produce other types of geometric primitives, such as lines and line segments, planes, circles and ellipses, triangles and other polygons, spline curves, etc.

The recognition module 320 also produces the geometric constraints 304 that are among the new geometric primitives 303 and the constraint that are between the currently existing primitives 308 and the newly inputted primitives 303. In other words, the geometric constraints 304 detected by the recognition module 320 not only correspond to characteristics of an individual component that is most recently inputted, they also correspond to geometric relationships between the components that has been detected and processed previously, i.e. the existing primitives 308, especially the existing components located nearby the newly inputted data. A boundary 305 is setup for the solution of the geometric constraint solver 306 using the data from input module 314, i.e. the position data 302 and temporal data 310. The boundary 305 creates an additional way to effectively determine the user's intent. The boundary 305 is based on the possible error that the user could make and that the solution 307 would still predict what the user intended.

In one embodiment of the present invention, the recognition module 320 estimates the errors by the user or from the motion tracking hardware when producing the new geometric primitives 303 and geometric constraints 304. To predict and process these errors, the system 300 estimates the possible errors based on data obtained through the input module 314, i.e. the temporal data 310 and other data 312. The temporal data 310 can be in different forms e.g. timestamp at each timestamp or velocity at each position. The recognition module 320 would increase the possible error at positions of higher speed, and decrease the possible error at positions of lower speed. Other data 312 collected can also be used in the error correcting process, such as the pressure applied to the surface while sketching. The recognition module 320 increases the possible error at positions of higher pressure, while decreases the possible error at positions of lower pressure.

The new geometric primitives 303 with the parameters resulting from the solution are together presented as graphics result 330. The graphics result 330 are plotted and displayed back to the user through the output device. The user is then allowed to correct any mistakes made by the system 300.

One embodiment of the system 300 interprets user's input data as a series of lines—straight, circular or free-form Bezier. The input module 314 sends the data to the recognition module 320 for determination—whether the new geometric primitive is one of the recognized primitives, i.e. straight line, circular arc or free-form Bezier line. Even though Bezier line can be fitted to any input line, the raw input may contains user error or hardware detection error. Two criteria are used to minimize such error but represents user intention best possible: the angle change in each Bezier line segment should not be smaller than a certain angle, e.g. 45 degree, and user should have spent a certain amount of time during the drawing of this Bezier line, e.g. 1 ms.

In one embodiment the user is given the option to switch between the three primitives and also limit the system 300 to produce only one or two of the three primitives. The user is also allowed to modify these three primitives after the drawing is done. When modifying primitives after the drawing is done, the area enclosed by the lines detected becomes a part of the information processed by the recognition module 320. The user can make modifications to the primitives to an already completed drawing through selection of these primitives choices presented in the user interface. Thus, if a user inputs a rectangle into a prior art system that recognizes rectangular, the prior art system will record and output the result as a rectangle and remain recognizing that input as a rectangle. In the present system, however, the user can change any line on the rectangle and make it no longer a rectangle. For example the rectangle could be changed to a triangle by moving one line of the rectangle from its horizontal position to a 45 degrees position.

The recognition module 320 looks for possible geometric relationship between the new geometric primitives 303 and existing primitives 308, which are the geometric constraints in block 304. These are the geometric relationship that is intended by the users such as two parallel straight lines of same length. By applying these geometric relationships, it also beautifies the graphics result 330. For each geometric constraint 304, the recognition module 320 will check how close the current state of the primitives match the predicted geometric constraint, such as the length difference for length equality. If the difference is within certain limit, the relationship would be considered possibly intended by user.

There are low-level geometric relationships, because of they involve lower levers abstractions, such as perpendicularity between the lines. There are also geometric relationships resulted from higher-level object adjustment, such as congruency of two rectangles. Then there are also constraints resulted from even higher-level adjustment due to logical meaning, such as the connecting line in a flow chart.

In one embodiment, the recognition module 320 recognizes a set of predetermined geometric constraints previously stored. These geometric constraints are sorted and applied in an order where constraint with higher confidence, higher significance and lower level are applied first. When the recognition module 320 applies multiple possible relationships to a set of primitives, the recognition module 320 could find more than one solution that can fulfill the underlying relationships, or in some occasions the recognition module 320 can find no solution to the underlying relationships. When there are multiple satisfactory solutions, the recognition module 320 selects a solution that has high confidence. High confidence refers to constraint that the position difference between the predicted geometric constraints 304 and the input data 302, 310, and 312 is small. The higher the confidence level is, the closer the graphic outcome is to what the user drew.

However, when there is no solution, the recognition module 320 selects a subset of relationships to fulfill. Some of the solutions might lie outside the possible error limit and thus are rejected. The recognition module 320 also contains a list of rejection conditions for solutions that deserves automatic rejection. For example the recognition module 320 would reject a solution that causes two lines to overlap each other. An example illustrated at FIG. 7A would be: Two straight lines 701 and 702 share the same end point and very close to each other. Line 701 is already parallel with line 703. The recognition module 320 could have detected a possible parallel relationship between lines 702 and 703 and one solution to that would be to change the angle of line 702 to match that of 703. It would cause lines 702 and 701 to overlap each other and visually combined to be one line. It is presumed that user intended 2 separate lines instead of 1, so in general this condition is undesirable to the user, thus this solution to the parallel relationship would be rejected.

One other example of automatic rejections would be solutions that result in a graphic that a user is highly unlikely to draw. Given that a human can hardly distinguish two points that are very close to each other from two connected points, it is unlikely intended by user. FIG. 7B illustrated 3 unconnected yet close endpoints at 710. It could be perceived as visually unpleasing. If the unconnected points are so close that is visually indistinguishable, it would be confusing to user. Therefore, solutions that result granularity that users cannot observe, such as two extremely close yet unconnected points, would be rejected.

Significance is more case specific. When the recognition module 320 applies a constraint to a new geometric primitive 303, other existing geometric primitives 308 and their applied geometric relationships may also be affected. The affected existing geometric primitives 308 are located first, and then the geometric relationships that are already applied to these primitives 308 are retrieved. The geometric constraint solver 306 will try to find a solution with minimum offset, which is within the solution boundary 305, and survives the list of rejection criteria.

The possible relationships are assigned with different priority. The priority is positively correlated to the difference between relationship and the current state of the primitives. To further illustrate: a higher difference indicates a lower possibility that the user intends the relationship. The higher level of logical meaning indicates a higher possibility of user intention. For example, the straight lines at the end of a line might have the logical meaning of an arrow. Or the straight line that points to the center of two boxes has the logical meaning of connection in a flow chart. The geometric constraint solver 306 assumes that the user tries to draw as close to the intention as possible. Solutions with high priority that are those closer to the intention determined by the geometric constraint solver 306.

Some relationship is harder for human to complete through free-sketch movements. An example would be drawing a line to the center of a circle. It is hard to accurately locate the center of a large circle, because the user has to deduce the point from the observation of the circle. One cannot locate the circle center as precise as, for example, the end of a line. When evaluating these type relationships that are logical but hard for a user to implement, the possible positional error limit should be higher. And in some embodiments, since the position difference is also used to determine the priority, the priority of these kinds of logical relationships would be increased despite of the larger discrepancies on position difference.

Figure 3A:
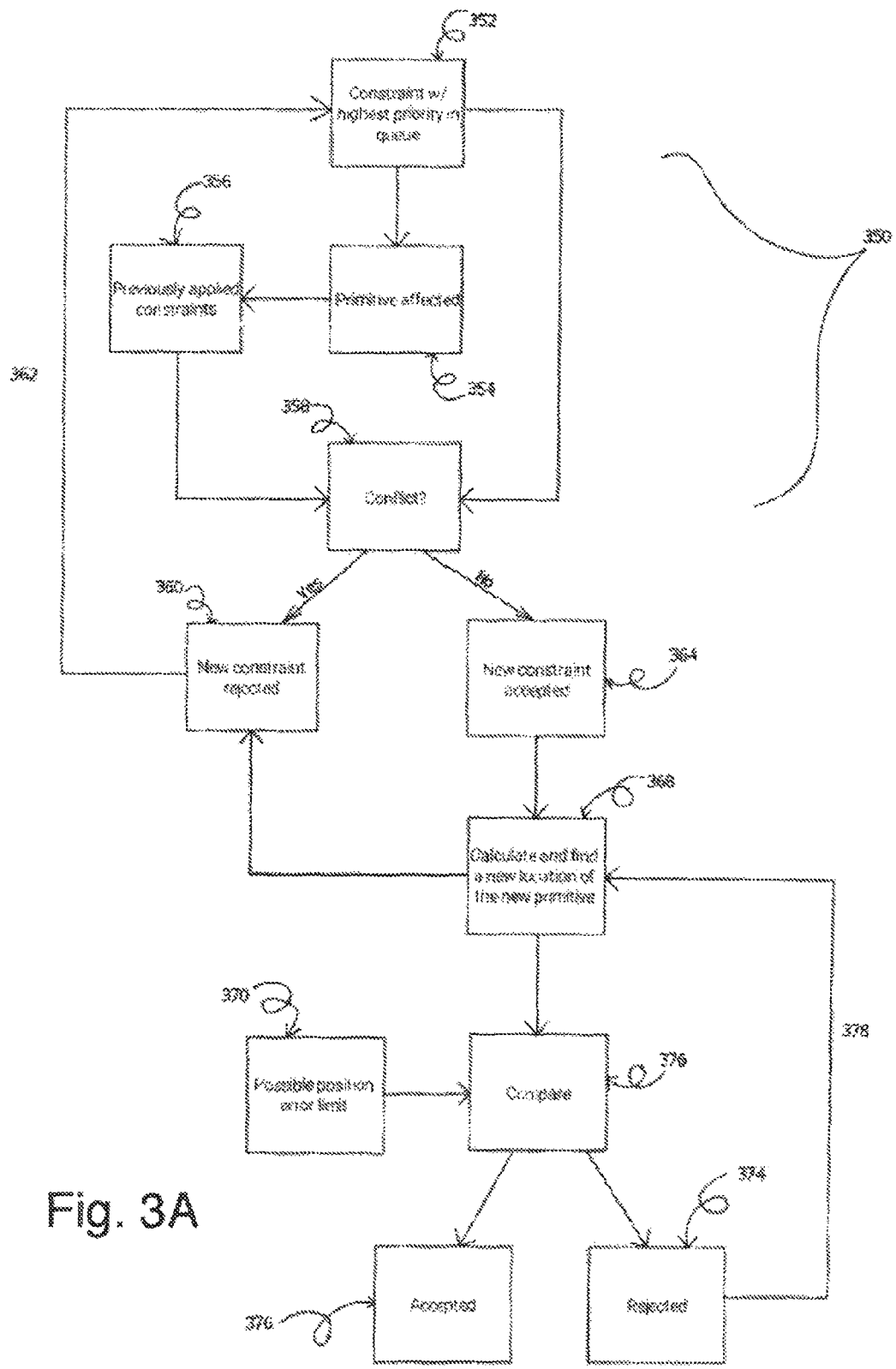
FIG. 3A shows an implementation of the geometric constraints solver module.

One embodiment of the geometric constraint solver 306 is illustrated in FIG. 3A. Process flow 350 represents the geometric constraint solver 306's process of the primitives 303 and 308, constraints 304, and solution boundary 305. The geometric constraint solver 306 would apply the geometrics relationships one at a time from high to low priority. Any newly applied relationship must not invalidate the previous applied relationship. All previously applied relationships are stored in the system 300 and can be processed by the geometric constraint solver 306. When the geometric constraint solver 306 attempts to apply a new relationship with the highest priority in the queue in block 352, the geometric constraint solver 306 first determines the primitives this new proposed relationship is going to affect, and how are the primitives going to be affected. The primitives will be affected by the newly proposed constraint/relationship is determined at block 354. For example, the right angle relationship would affect the two straight lines that form the right angle. The constraints that have been previously applied to the affected primitives are also retrieved by the solver at block 356. The newly proposed constraint should not conflict with constraints previously applied, as block 358 determines. If the newly proposed relationship conflicts with the relationships applied to the affected primitives, this newly proposed relationship is rejected by the geometric constraint solver 306 at block 360. The geometric constraint solver 306 continues to attempt to apply the next relationship of lower priority. The geometric constraint solver 306 continues this process 362 until it finds a proposed relationship that does not conflict with the any of the previously applied relationships, as shown in 364.

The geometric constraint solver 306 then calculates a position of the new primitive 303 with the accepted constraint found in block 364. In block 368, the geometric constraint solver 306 calculates the position that fulfills the accepted relationship and post applied relationships, while minimizing the distance from the original location of the user input. The calculation could be done by a lower-level geometric constraint solver with difference optimization. The result of the calculation from block 368 is compared in block 372 with possible error limit 370. When there are multiple solutions calculated in block 368 that can satisfy the same set of relationship, these solutions are all compared and rejected against the list of rejection criteria 370. Rejected solutions 374 will not be applied to the new primitive 303, and the geometric constraint solver 306 uses the next potential solution to reinitiate the comparison process 378.

If the solution is accepted as in block 376, the relationship is applied and stored in a way that can be retrieved by the primitives it depends on, so that when a new relationship is applied, this relationship can be retrieved and considered if the new relationship affects the applied primitive.

In one embodiment of the invention, the data is processed and result graphics 330 are displayed to the user after each stroke, so the user can correct any part of the result graphics 330 when the result graphics 330 is getting further away from the intended graphics. The users can either edit the result graphics 330 with the parameter of the primitives, for example change the length and angle of the primitives directly or the users can correct the steps of recognition and geometric constraint application through an undo paradigm.

In one embodiment of the present invention, a user may correct any system recognition results via the undo paradigm. The system is expected to produce the desired result in most cases, and the users are left with a small number of highly contextual-dependent choices. Users wouldn't have to consider or look through a large menu of choices, which is time-consuming and be in the way of the creation process. The user's choices during the "undo" process are stored according to their dependency on the input data, specifically the shapes of the input graphics. It is possible to execute the "undo" process not strictly limited to chronological order, as long as the system's 300 goal to cause minimal effect on the rest of the existing geometric primitives 308 is accomplished most successfully.

FIG. 4 visualizes the structure of the undo stack in one embodiment of the undo process 400. The undo system 400 in the illustrated embodiment enables higher abstraction level, keeping track of the action dependency instead of just chronological order. A user could jump back to several actions ago and change that stroke several strokes ago, if the changed stroke is not dependent on the newly input stroke. This allows user to rewind specific action without affecting the rest of the graphics. Both the user initiated actions, for example free-form shape transform, and the system initiated beautification actions, position aligned with nearby shape, are kept as separate items in the undo system. The undo system keeps separate undo and redo stacks for individual shapes, for example in FIG. 4, shape 1, 3 and 3 in the workspace. A redo stack of the system corresponds with the undo stack and looks just like an undo stack. Actions that affect several shapes would be placed on multiple shape stacks as shown in FIG. 4, for example as shown in boxes 402 and 403. Independent actions item that can be rewind separately could be added to the shape stack as a group, for example boxes 404 in shape 1 undo stack and boxes 406 in shape 3 undo stack. Boxes 404 count as one group item in the stack, and then each box in 404 can be rewind separately in the system. Executing the independent one undo item, for example either one of the boxes of box group 404, would take out the corresponding undo item in the group. Until the last independent undo items, for example the other item of the box group 404 is taken out, then box group 404 is taken out as well. For non-group items, for example boxes 408, 410, 412, 414, 416, 418, 420 and 422, executed undo item will be taken out of the stack.

All executed undo items are placed in the redo stack of the shape which allows using to re-commit the rewind action. The current items in the redo stack would be cleared out when there is a new undo item being placed on the undo queue.

In each undo queue, before an undo item is executed, the undo items above that item would all be executed first if there were any. For example before 410 is executed, 408, 402, 403, 404 will all be executed, as well as 412 and 402. This is because boxes 412 and 406 are dependent on action 402.

Depending on implementation, different embodiment of this undo process 400 might or might not implements redo stack; may or may not allow group undo item that contains undo items that can be separately rewind. Different embodiments might use different data structure rather than stack to store and organize the undo items. Different embodiments might or might not keep the user initiated action and system initiated beautification system in the system or data structure. Different embodiments might separate the stack in more criteria other than shape, for example but not limited to, locations on the screen or users in multiple users environment or other logical structure like page and book. Different embodiments might keep track of the dependency of the different action items through additional ways other shape. Different embodiments might also selectively combine and split the shape undo stacks for other reasons specific to implementation.

Figure 5A:
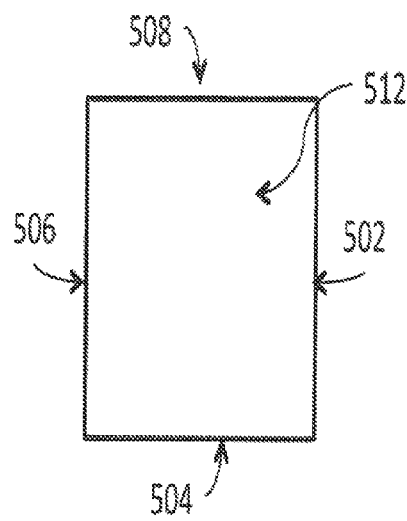
FIG. 5A shows an illustration of four perpendicular straight lines enclosing a rectangular area.

It is mentioned previously that the lines can be used to formed higher-level object and inside the object there might be an enclosed area by the lines. There is a mechanism in the example embodiment to identify such enclosed area. An example as shown in FIG. 5A is that there are four perpendicular straight lines 502, 504, 506 and 508 that formed the shape resembled of rectangle outline 510, and this mechanism would identify the rectangular area 512 enclosed by these four straight lines 502, 504, 506, and 508. The mechanism can generate any shapes of enclosed area without matching to particular library of shapes, which works well in conjunction with the rest of the system.

In the example embodiment, the system uses a graph to identify such area. The graph mentioned is specifically the technical term of graph in computer science field, where graph is a structure that makes up of nodes and edges. Edges indicate the node to node connections. A cycle is a sequence of nodes, where the start and end nodes are the same but no edges is repeated.

Each intersection point between two lines is a node in the graph. Each node is connected to each other if the two nodes are on the same line and there is no other node between them. In another word, the nodes on a continuous line are connected to only the nearest nodes on the line in the graph. In the case of node that is the connection point of two lines, the node is connected to the nearest nodes on each line as edges. Each node has an actual Euclidean coordinate associated. All intersection points are added to graph. Each enclosed area of the lines is a cycle in the graph. Please see FIGS. 5B and 5C for illustration.

Figure 5B:
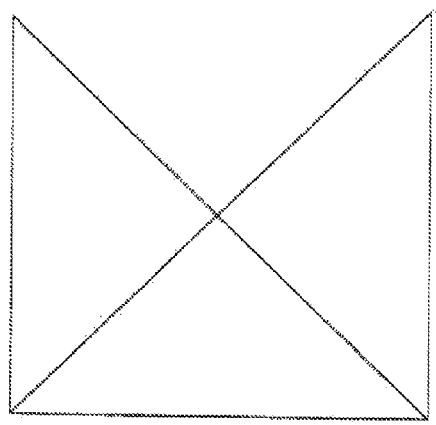
FIG. 5B shows a drawing with 5 straight lines.
Figure 5C:
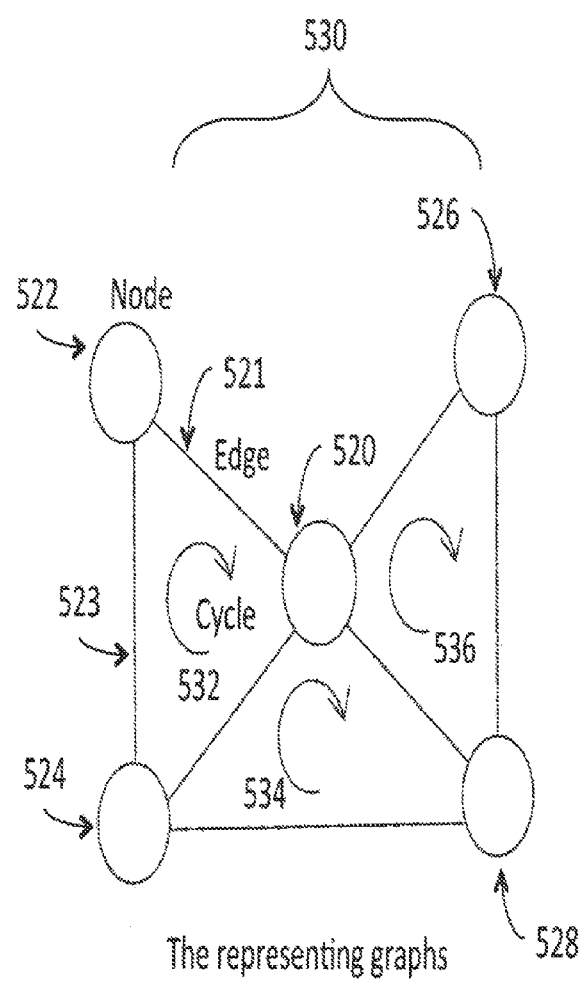
FIG. 5C is an illustration of the nodes, lines and enclosed areas relationships corresponding to the drawing in FIG. 5B.

FIG. 5C is an illustration of the nodes, lines and enclosed areas relationships corresponding to the drawing in FIG. 5B. Node 522 is connected to 524 through edge 523, and node 522 is also connected to node 520 through edge 521.

In the case shown in FIG. 5C, these non-overlapping areas will be the 3 triangular areas—cycles 532, 534 and 536. There are 6 possible cycles in FIG. 5: 3 non-overlapping ones 532, 534 and 536, 3 combinations of the 3 non-overlapping ones (532 and 534), (534 and 536), (532 plus 534 plus 536). These smallest non-overlapping areas are areas that cannot be broken down into any smaller area; they do not overlap with each other; and they together filled up the entire area 530.

In an example embodiment, to identify a cycle in the graph 530, it traverses the graph's nodes 522, 524, 526 and 528 node by node, and it marks the nodes that are visited. If it is able to traverse back to the starting node without visiting a node twice, then a cycle is identified.

The non-overlapping areas are the cycles that always turn to the sharpest left or sharpest right. To describe sharpest left/right in a more mathematical way: if the difference in angle between the last edge and the next edge are calculated in degrees between −180 to 180, then the sharpest right/left edge would be the next edge that is the most positive/most negative edges. Please note that depending on the situation, not all cycles produced this way are the smallest non-overlapping areas, but they can be screened by a simple area test.

FIG. 6 shows an implementation of the cycle identification module. When a line is added to the object in step 601, the cycle identification module would check for the intersections with all the other lines in the object in step 602. The intersection points would be added in order along the new line as nodes to a graph in step 603. In step 604, it would traverse the graph to identify cycles that represents a non-overlapping area. Sometimes it would create a new enclosed area that doesn't overlap with existing enclosed area in step 605 or it would split an existing enclosed area into smaller areas in step 606.

When a line is marked to be connected to another line, the cycle identification module would asynchronously add the new line to the group of lines that are now connected. For example in FIG. 7C, a newly added line 735 is identified to be connected to lines 731, 732, 733 and 734 at point 740 and 741. The cycle identification module would therefore identify that 735 splits the existing rectangular area into two smaller rectangular areas. Consider the common visual relationship that text is centered at an area, where it is understood as a textbox. Now text would be aligned at different locations because of the new area. So the identification of the new area has changed the relationship and result.

Area is part of the vector graphics intended by the user. It represents higher level information at times, such as text box and chart area. The cycle identification module identifies it together with the rest of the system 300, to provide user the vector graphics intended. It is used throughout different part of the system 300, for example, in module 304 as a basis to look for some geometric relationships.

The invention claimed is:

1. A computer system for assisting a user in producing a drawing, the computer system being configured to:
   receive graphics input, from a user, using a data input device;
   record at least one set of data from said data input device;
   recognize at least one geometric primitive present within a solution boundary to form at least one recognition result, wherein the solution boundary is set up based on one or more positional errors associated with position data based on the velocity of user's hand at each position, while providing said graphics input;
   store all recognition results;
   predict user's intent based on said stored recognition results for producing at least one graphics result; and
   present said at least one graphics result.

2. The computer system of claim 1, further configured to recognize at least one geometric constraint.

3. The computer system of claim 2, further configured to evaluate priorities of the at least one geometric constraint.

4. The computer system of claim 2, further configured to reject a newly added geometric constraint if said newly added geometric constraint is in conflict with a list of recorded previous geometric constraints.

5. The computer system of claim 1, further configured to estimate positional error from said graphics input.

6. The computer system of claim 1, wherein said data input device comprises a touch screen.

7. The computer system of claim 6, further configured to estimate the positional error from pressure applied to said touch screen while providing said at least one set of data.

8. The computer system of claim 1, wherein said data input device is integrated with an output device.

9. A method comprising:
   detecting at least one series of data input, said data input representing user stroke data, input through an input device;
   recognizing at least one primitive within said data;
   recognizing at least one solution boundary;
   recognizing at least one geometric constraint associated with said primitive present within the solution boundary to form at least one recognition result, wherein the solution boundary is set up based on one or more position errors associated with position data, based on the velocity of user's hand at each position, while providing said data input;
   storing said at least one recognition result;
   predicting user's intent based on the stored at least one recognition result for producing at least one graphics result; and
   storing and displaying said at least one graphics result.

10. The method of claim 9, further comprising estimating said at least one positional error based on said at least one series of data input.

11. The method of claim 10, further comprising rejecting a newly added geometric constraint if said newly added geometric constraint corresponds to said at least one positional error.

12. The method of claim 9, further comprising rejecting a newly added geometric constraint if said newly added geometric constraint is in conflict with a list of recorded previous geometric constraints.

13. The method of claim 9, further comprising evaluating priority of said at least one geometric constraint by comparing said at least one geometric constraint's location with said data input from said user.

14. The method of claim 9, further comprising evaluating priority of said at least one geometric constraint by their logical significance.

15. The method of claim 9, further comprising evaluating priority of said at least one geometric constraint by their cognitive difficulty to draw by a user.

16. The method of claim 9, further comprising rejecting a newly added geometric constraint corresponding to a predetermined list of illogical limitations.

17. The method of claim 9, further comprising allowing said user to edit said prediction of user's intent directly using at least one prediction parameter.

18. The method of claim 9, further comprising allowing said user to edit said prediction of user's intent through an undo paradigm.

19. The method of claim 18, further comprising allowing said user to edit said prediction of user's intent based on the at least one prediction's achronological order.

20. The method of claim 9, wherein the at least one primitive is selected from a straight line, circular arc, and free-form Bezier line.

21. The method of claim 9, further comprising producing enclosed areas using said at least one primitive.

22. The method of claim 9, further comprising estimating said at least one positional error based on pressure applied to said data input device while providing said data input.

\* \* \* \* \*